United States Patent
Krishnan et al.

(10) Patent No.: US 11,593,249 B2
(45) Date of Patent: Feb. 28, 2023

(54) SCALABLE POINTS-TO ANALYSIS VIA MULTIPLE SLICING

(71) Applicant: Oracle International Corporation, Redwood Shores, CA (US)

(72) Inventors: Padmanabhan Krishnan, Brisbane (AU); Raghavendra Kagalavadi Ramesh, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 483 days.

(21) Appl. No.: 14/757,684

(22) Filed: Dec. 23, 2015

(65) Prior Publication Data

US 2017/0185504 A1  Jun. 29, 2017

(51) Int. Cl.
  *G06F 11/30* (2006.01)
  *G06F 9/44* (2018.01)
  *G06F 11/36* (2006.01)
  *G06F 8/75* (2018.01)

(52) U.S. Cl.
  CPC .......... *G06F 11/3604* (2013.01); *G06F 8/75* (2013.01); *G06F 11/362* (2013.01)

(58) Field of Classification Search
  CPC ...... G06F 11/3604; G06F 11/362; G06F 8/75; G06F 21/125; G06F 21/14; G06F 21/563; G06F 21/52; G06F 21/54; G06F 21/60
  See application file for complete search history.

(56) References Cited

U.S. PATENT DOCUMENTS

| | | | | |
|---|---|---|---|---|
| 8,335,317 B2* | 12/2012 | Vanstone | ............... | G06F 21/00 380/282 |
| 8,930,927 B2* | 1/2015 | Bowler | ............... | G06F 11/366 717/140 |
| 9,471,514 B1* | 10/2016 | Badishi | ............... | G06F 12/1458 |
| 9,852,757 B2* | 12/2017 | Cai | ............... | G11B 20/1403 |
| 2002/0129343 A1* | 9/2002 | Pinter | ............... | G06F 8/434 717/140 |

(Continued)

OTHER PUBLICATIONS

Zheng, X., Rugina, R., "Demand-Driven Alias Analysis for C", POPL'08, Jan. 7-12, 2008, 12 pages.

(Continued)

*Primary Examiner* — Lewis A Bullock, Jr.
*Assistant Examiner* — Mohammad H Kabir
(74) *Attorney, Agent, or Firm* — Ferguson Braswell Fraser Kubasta PC

(57) ABSTRACT

A method for analyzing software with pointer analysis may include obtaining a software program, and determining a first independent program slice of the software program describing a first code segment of the software program. The method may further include determining, using a first pointer analysis objective, a first result from performing a first pointer analysis on the first independent program slice, and determining, using the first result, a first dependent program slice of the software program. The method may further include determining, using a second pointer analysis objective, a second result from performing a second pointer analysis on the first dependent program slice. The method may further include generating a report, using these results, indicating whether the software program satisfies a predetermined criterion.

14 Claims, 10 Drawing Sheets

(56) References Cited

U.S. PATENT DOCUMENTS

| | | | | |
|---|---|---|---|---|
| 2004/0123273 | A1* | 6/2004 | Hammerich | G06F 8/436 717/126 |
| 2009/0006863 | A1* | 1/2009 | Mizuno | G06F 21/78 713/190 |
| 2009/0037690 | A1* | 2/2009 | Busck | G06F 8/434 711/221 |
| 2009/0113550 | A1* | 4/2009 | Costa | G06F 21/52 726/25 |
| 2009/0249307 | A1* | 10/2009 | Yoshida | G06F 8/75 717/131 |
| 2010/0083240 | A1* | 4/2010 | Siman | G06F 8/433 717/144 |
| 2011/0258610 | A1* | 10/2011 | Aaraj | G06F 21/554 717/128 |
| 2014/0130020 | A1* | 5/2014 | Boshernitsan | G06F 8/71 717/131 |
| 2014/0208430 | A1* | 7/2014 | Guarnieri | G06F 21/52 726/25 |
| 2015/0186114 | A1* | 7/2015 | Chirhart | G06F 8/30 717/110 |
| 2016/0246992 | A1* | 8/2016 | Brutschy | G06F 21/6245 |
| 2017/0364698 | A1* | 12/2017 | Goldfarb | G06F 21/6218 |

OTHER PUBLICATIONS

Sridharan, M., et al., "Demand-Driven Points-to Analysis for Java", OOPSLA'05, Oct. 16-20, 2005, 18 pages.

Yan, D., et al., "Demand-Driven Context-Sensitive Alias Analysis for Java", ISSTA '11, Jul. 17-21, 2011, 11 pages.

Allen, N., et al., "Staged Points-to Analysis for Large Code Bases", LNCS vol. 9031, Apr. 11-17, 2015, 20 pages.

Bravenboer, M., et al., "Strictly Declarative Specification of Sophisticated Points-to Analyses", In Proceeding of th e24st ACM SIGPLAN Conference on Object Oriented Programming Systems Languages and Applications, OOPSLA 09, Oct. 25-29, 2009, 19 pages.

Sridharan, M., et al, "Refinement-Based Context-Sensitive Points-to Analysis for Java", In Proceedings of the 2006 ACM SIGPLAN Conference on Programming Language Design and Implementation, PLDI '06, Mar. 31, 2006, 17 pages.

Smaragdakis, Y., et al., "Set-Based Processing for Points-to Analysis", In ACM SIGPLAN International Conference on Object Orientated Programming Systems Languages and Applications, Oct. 29-31, 2013, 17 pages.

* cited by examiner

Software Program 600

```
602 Public class Example {

604 Static T field;

606 Public void entry(T data) {

608 field = data;

610 interim(data);}

612 Public void start() {

614 elevate()}

616 Private void interim(T t) {

618 goAhead(t)}

620 Private void elevate() {
    622 goAhead(field);}

624 Private void goAhead(T t) {

626 T.security-sensitive-method()}
```

FIG. 6A

SCALABLE POINTS-TO ANALYSIS VIA MULTIPLE SLICING

BACKGROUND

Pointer analysis (also known as points-to analysis) has become a fundamental static program analysis technology leveraged by program analyses including optimization, verification, debugging, and security. For example, a pointer analysis may compute the set of memory locations accessible by a pointer (reference) variable.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments of the invention relate to a method for analyzing software with pointer analysis including obtaining a software program, and determining a first independent program slice of the software program. The first independent program slice describes a first code segment of the software program. The method further includes determining, using a first pointer analysis objective, a first result from performing a first pointer analysis on the first independent program slice, and determining, using the first result, a first dependent program slice of the software program. The first dependent program slice describes a second code segment of the software program. The second code segment overlaps a portion of the first code segment. The method further includes determining, using a second pointer analysis objective, a second result from performing a second pointer analysis on the first dependent program slice, and generating a report, using the first result and the second result, indicating whether the software program satisfies a predetermined criterion.

In general, in one aspect, one or more embodiments of the invention relate to a system for analyzing a software program with pointer analysis including a processor, a repository, configured to store at least the software program, and a memory including instructions that, when executed by the processor, cause the processor to obtain a software program, and determine a first independent program slice of the software program. The first independent program slice describes a first code segment of the software program. The instructions further include determining, using a first pointer analysis objective, a first result from performing a first pointer analysis on the first independent program slice, and determining, using the first result, a first dependent program slice of the software program. The first dependent program slice describes a second code segment of the software program. The second code segment overlaps a portion of the first code segment. The instructions further include determining, using a second pointer analysis objective, a second result from performing a second pointer analysis on the first dependent program slice, and generating a report, using the first result and the second result, indicating whether the software program satisfies a predetermined criterion.

In general, in one aspect, one or more embodiments of the invention relate to a non-transitory computer readable medium including instructions that, when executed by a processor, perform a method for analyzing software with pointer analysis including obtaining a software program, and determining a first independent program slice of the software program. The first independent program slice describes a first code segment of the software program. The method further includes determining, using a first pointer analysis objective, a first result from performing a first pointer analysis on the first independent program slice, and determining, using the first result, a first dependent program slice of the software program. The first dependent program slice describes a second code segment of the software program. The second code segment overlaps a portion of the first code segment. The method further includes determining, using a second pointer analysis objective, a second result from performing a second pointer analysis on the first dependent program slice, and generating a report, using the first result and the second result, indicating whether the software program satisfies a predetermined criterion.

Other aspects of the invention will be apparent from the following description and the appended claims.

BRIEF DESCRIPTION OF DRAWINGS

FIG. 6A and FIG. 6B show examples in accordance with one or more embodiments of the invention.

DETAILED DESCRIPTION

Figure 1A:
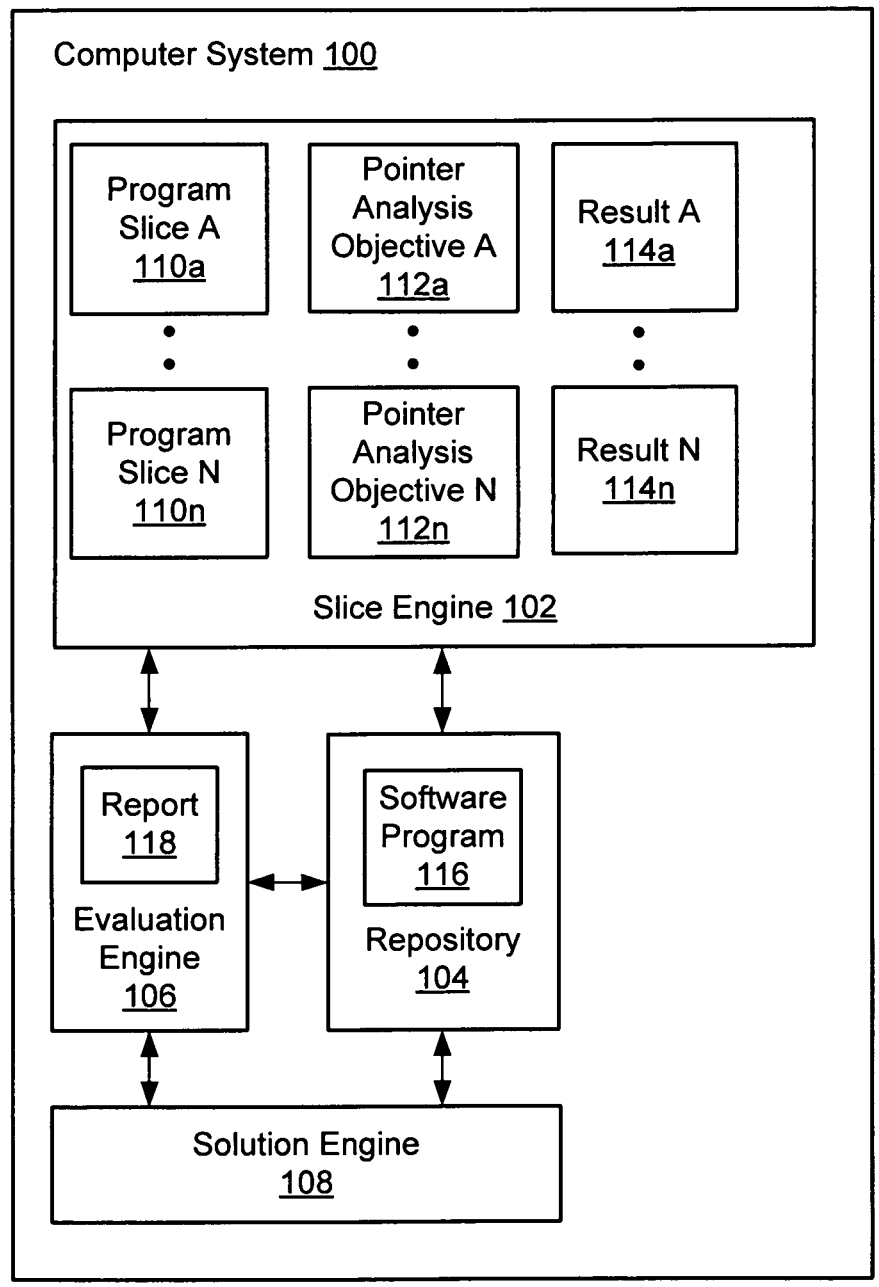
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention include a method, a system, and a non-transitory computer readable medium for analyzing software with pointer analysis. In particular, one or more embodiments are directed to a method that divides a software program into various program slices according to pointer analysis objectives. The method may then perform a pointer analysis on each program slice. In other words, a general pointer analysis for the software program may be decomposed into a set of pointer analysis objectives with inter-dependencies among these pointer analysis objectives. In one or more embodiments, a pointer analysis depends on the results of a previous pointer analysis. Thus, a distinct program slice may be computed from the software program for each pointer analysis objective, where each program slice may cover different code segments of the software program.

FIG. 1A shows a system in accordance with one or more embodiments of the invention. As shown in FIG. 1A, the system includes a computer system (100) that includes a slice engine (102), a repository (104), an evaluation engine (106), and a solution engine (108). Furthermore, the computer system (100) may be the computing system described with respect to FIG. 7 and the accompanying description below. As shown in FIG. 1A, the computer system (100) includes a slice engine (102). In one or more embodiments of the invention, the slice engine (102) may be hardware and/or software that includes functionality to compute program slices (110a-110n) from a software program (116) relative to pointer analysis objectives (112a-112n).

In one or more embodiments of the invention, the software program (116) is a collection of source code used to build software applications or components. That is, the software program (116) may be a collection of computer instructions written in a human-readable programming language. The software program (116) may be transformed by a compiler program into binary machine code. Compiled machine code may then be executed by a processor in order to run the application generated from the software program (116). The program slices (110a-110n) may be code segments extracted from a software program (116) that may contain variables, fields, software methods, etc. For example, a program slice may be a contiguous or non-contiguous subset of the software program (116), and the program slices (110a-110n) may be executable or non-executable.

In one or more embodiments of the invention, a pointer analysis objective (112a-112n) may be a particular criterion that provides a metric for performing a pointer analysis on a program slice. In one or more embodiments of the invention, for example, a pointer analysis objective (112a-112n) specifies the query variables (for which points-to information may be computed) that are the focus of a pointer analysis. In particular, the pervasive use of pointers and references in imperative languages such as C or Java has led to a large body of research devoted to the pointer analysis problem, which aims to extract information about pointer values in programs. Pointer analyses may vary in their level of precision and to the extent that they consider control flow and other contextual factors. Scaling pointer analysis to large programs has been a challenge for the program analysis community. Refinement-based analysis and client-based analysis are two of the most common approaches to address this challenge. Client-based analysis limits the pointer analysis to a set of query variables, rather than exhaustively analyzing all variables. Refinement-based analysis (also known as staged analysis) may successively narrow the size of the program fragments, or program slices, being analyzed, while improving the precision of the analysis. With refinement-based analysis, each successive program slice is a subset of the previous program slice.

In one or more embodiments, a pointer analysis objective is used to generate program slices (110a-110n) from the software program (116). In one or more embodiments of the invention, a pointer analysis corresponding to a pointer analysis objective (112a-112n) may be applied to a program slice (110a-110n) of a software program (116) to generate corresponding results (114a-114n)). In one or more embodiments, these results (114a-114n) may include one or more paths through the program slice (110a-110n). In one or more embodiments of the invention, pointer analysis objectives (112a-112n) may depend on the results (114a-114n) generated using one or more other pointer analysis objectives (112a-112n).

Figure 1B:
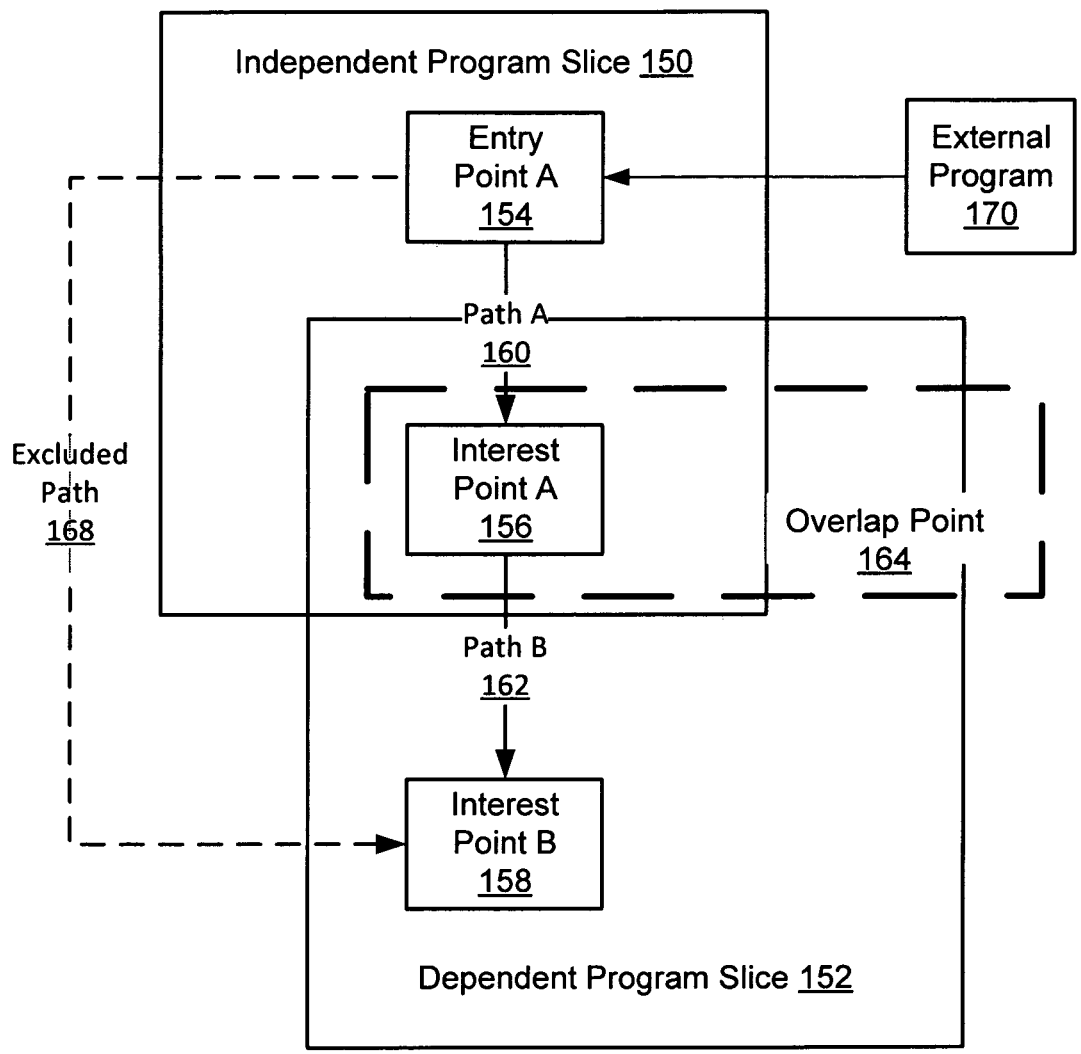

Turning to FIG. 1B, FIG. 1B shows a diagram of various pointer analyses in accordance with one or more embodiments of the invention. Specifically, in one or more embodiments, an independent program slice (150) may be computed by a slice engine ((102) in FIG. 1A) without using a result from any other program slice, while a dependent program slice (152) may be computed by the slice engine from the results (e.g., paths (160)) of the independent program slice (150). As shown in FIG. 1B, the independent program slice (150) may include one or more entry points (e.g., entry point A (154)) and one or more interest points (e.g., interest point A (156)). In one or more embodiments of the invention, entry points and interest points are statements, variables, or fields containing pointer variables. For example, the interest points (156, 158) may describe a query variable representing a starting point for a pointer analysis. In FIG. 1B, interest point A (156) may represent the starting point for a pointer analysis of an independent program slice (150), and interest point B (158) may represent the starting point for a pointer analysis of a dependent program slice (152).

Furthermore, entry point A (154) may represent an ending point for a pointer analysis. Thus, entry point A (154) is the ending point for a pointer analysis of an independent program slice (150). Note that interest point A (156) may serve as the entry point for a dependent program slice (152), in addition to serving as the interest point A (156) of the independent program slice (150). In one or more embodiments of the invention, an entry point (154) for a program slice (150) is where an external program (170) invokes the software program. The external program (170) may be a software program implemented by an operating system, for example, or any other software program that includes functionality to execute a code segment represented by the independent program slice (150) or the dependent program slice (152).

In one or more embodiments of the invention, multiple program slices may overlap at one or more overlap points. As shown in FIG. 1B, for example, the overlap point (164) is both the interest point (156) of independent program slice (150), and the entry point of dependent program slice (152). Performing a pointer analysis on program slices (150, 152) may result in one or more paths (160, 162) between the interest points (156, 158) and entry points (154, 156) (note that (156) functions as both an interest point of the independent program slice (150) and an entry point of the dependent program slice (152)). In one or more embodiments of the invention, an entry point for a dependent program slice (152) overlaps with an interest point (156) of an independent program slice (150).

In one or more embodiments of the invention, paths (160, 162) represent a uni-directional flow of control (or calling sequence) starting from an entry point and ending at an interest point. For example, sub-path A (160) connects interest point A (156) to entry point A (154) through independent program slice (150), and sub-path B (162) connects interest point B (158) to interest point A (156) through dependent program slice (152). This is because interest point A (156) is also the entry point of the dependent program slice (152)). In one or more embodiments of the invention, an excluded path (168) may be ignored by a pointer analysis when the slice engine determines that the excluded path (168) fails to contribute toward a pointer analysis objective for the pointer analysis. In one or more embodiments of the invention, the excluded path (168) connects two statements in different program slices (150, 152), where neither statement represents an overlap point (164) shared between the two program slices (150, 152). That is, in one or more embodiments of the invention, a path spanning two program slices (150, 152) is relevant to a pointer analysis when the path includes an overlap point (164) shared between the two program slices (150, 152).

In one or more embodiments of the invention, a points-to set (not shown) is a set of possible object-creation sites (i.e., program statements that declare, instantiate, and/or initialize objects) for objects that may be referenced by a variable set, where the points-to set is computed via a pointer analysis. That is, a points-to set computed for a particular variable set subsumes individual points-to sets for each variable in the variable set, each identifying possible object-creation sites for objects that may be referenced by the corresponding variable. In one or more embodiments of the invention, the points-to set includes points-to information for the query variables specified by the interest points (156, 158) of a program slice (150, 152).

Returning to FIG. 1A, in one or more embodiments of the invention, the slice engine (102) includes functionality to compute a program slice (110a-110n) subtractively (i.e., by removing code from the software program (116)) and/or additively.

In one or more embodiments of the invention, the slice engine (102) includes functionality to remove code related to sub-paths that do not contribute to the pointer analysis objective (112a-112n). Thus, the slice engine (102) may implement copy propagation, redundant code (including dead code, unreachable code, etc.) elimination techniques, and/or equivalent code factoring to compact a program slice (110a-110n). In one or more embodiments of the invention, the slice engine (102) identifies removable code, at least in part, by building a value flow graph including the query variables of a pointer analysis objective (112a-112n), formal and actual arguments, return statements, object-creation sites, and/or receiver objects of method invocations at call sites. As part of the compaction process, the value flow graph may be utilized to compute equivalence classes between variables in order to remove redundancy.

In one or more embodiments of the invention, the slice engine (102) performs a context-insensitive pointer analysis and/or a context-sensitive pointer analysis. For example, a context-sensitive pointer analysis may be based, in part, on the control flow (e.g., as represented in a call graph).

In one or more embodiments of the invention, the evaluation engine (106) may be hardware and/or software that includes functionality to examine the results (114a-114n) generated from the program slices (110a-110n) using pointer analysis objectives (112a-112n). The evaluation engine (106) may include functionality to generate a report (118) indicating whether the software program (116) satisfies a predetermined criterion. In one or more embodiments of the invention, the report (118) also indicates specific results (114a-114n) that are particularly relevant to the pointer analysis objectives (112a-112n) and the predetermined criterion. The report (118) may highlight specific interest points and entry points that are particularly relevant to the analysis objectives, and/or may relate to program defects and areas desiring optimization.

In one or more embodiments, results (114a-114n) correspond to defects in the software program (116) and/or opportunities to optimize the software program (116). In one or more embodiments, a solution engine (108) proposes corrections to the program defects identified by the evaluation engine (106) and proposes ways to exploit the opportunities for optimization identified by the evaluation engine (106). For example, the solution engine (108) may propose a correction of a defect in the software program (116) by adding a statement to check for a condition and generate an error if that condition is not satisfied.

In one or more embodiments, the evaluation engine (106) and solution engine (108) may operate on each program slice (110a-110n) individually and/or may operate on the software program (116) as a whole.

In one or more embodiments of the invention, the repository (104) is any type of storage unit and/or device (e.g., a file system, database, collection of tables, or any other storage mechanism) for storing data. Further, the repository (104) may include multiple different storage units and/or devices. The multiple different storage units and/or devices may or may not be of the same type or located at the same physical site. In one or more embodiments of the invention, the repository (104) stores the software program (116) and any other data relevant to the operation of the slice engine (102), evaluation engine (106) and/or solution engine (108).

While FIG. 1A shows a configuration of components, other configurations may be used without departing from the scope of the invention. For example, various components may be combined to create a single component. As another example, the functionality performed by a single component may be performed by two or more components. The invention is not limited by the system shown in FIG. 1A.

Figure 2:
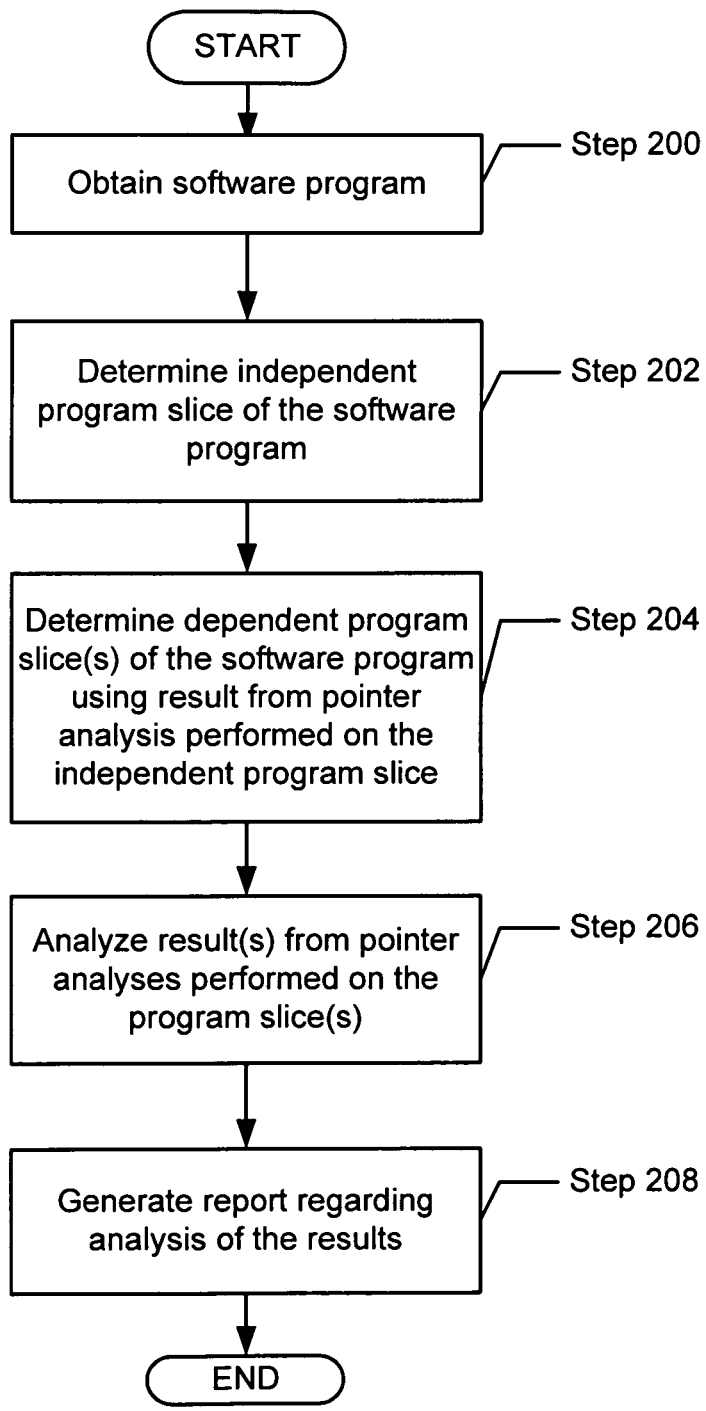
FIG. 2 and FIG. 3 show flowcharts in accordance with one or more embodiments of the invention.
Figure 3:
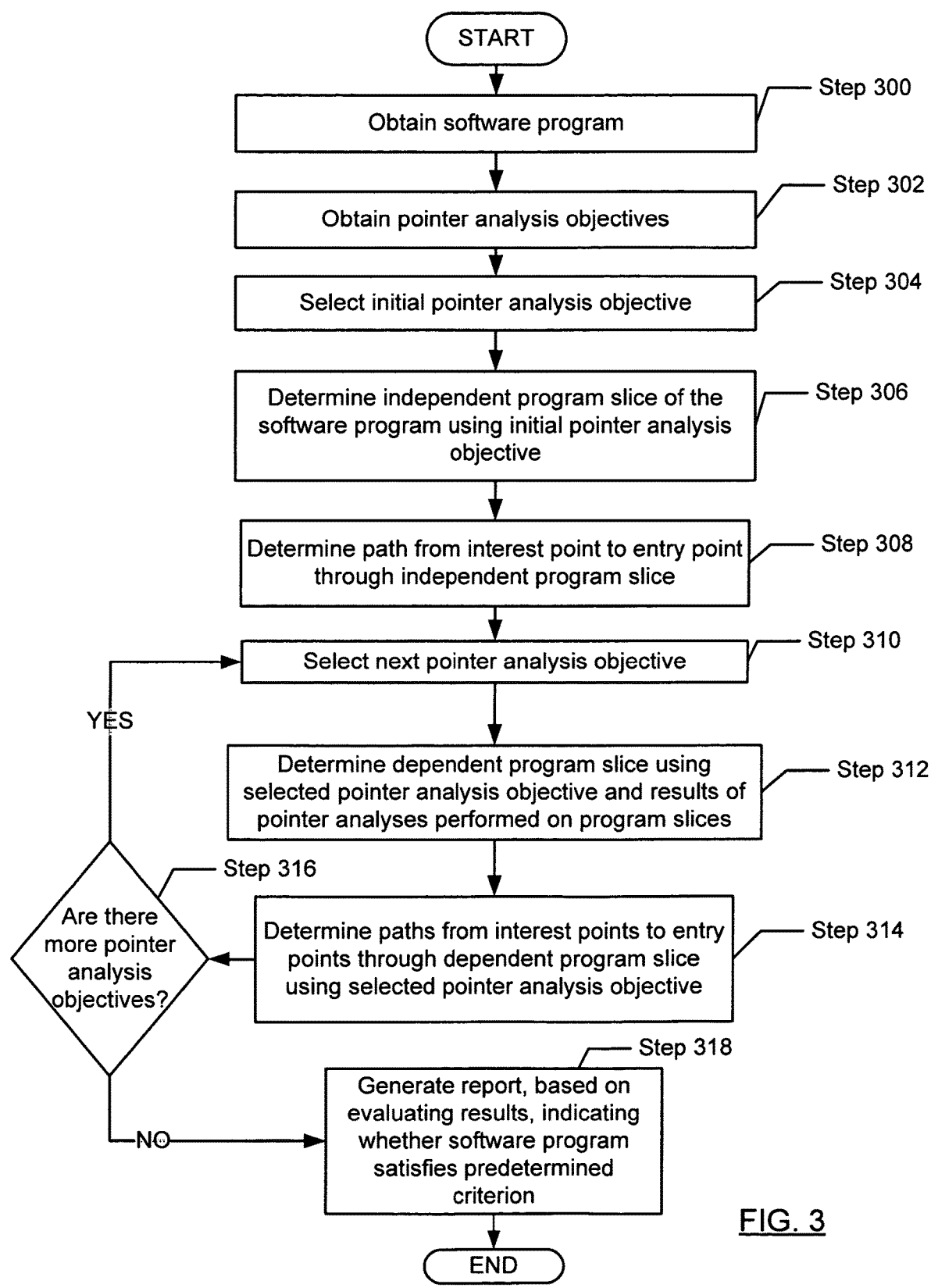

FIG. 2 and FIG. 3 show flowcharts in accordance with one or more embodiments of the invention. While the various steps in these flowcharts are presented and described sequentially, one of ordinary skill in the art will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 2 shows a flowchart describing a method for analyzing a software program with a pointer analysis, in accordance with one or more embodiments of the invention. One or more steps in FIG. 2 may be executed by components of the computer system (100) (discussed in reference to FIG. 1A).

In Step 200, a software program is obtained. For example, the software program may be obtained from a repository.

In Step 202, one or more independent program slices of a software program are determined in accordance with one or more embodiments. For example, using a slicing technique, the software program from Step 200 may be divided into program slices. Thus, these program slices may provide discrete components that may be analyzed faster than if an analysis were performed on the entire software program.

In Step 204, one or more dependent program slices of the software program are determined using a result from performing a pointer analysis on an independent program slice in accordance with one or more embodiments. For example, while the independent program slices in Step 204 may be determined without performing any previous pointer analyses, the dependent program slices may be determined from the results of one or more previous pointer analyses. For example, a particular path through an independent program slice may provide an input in determining a portion of the software program for a dependent program slice.

Furthermore, a slice engine may determine which program statements from the software program in Step 200 are included in a particular program slice, such as which program statements in the software program are excluded from the program slices. In one or more embodiments of the invention, for example, the slice engine uses rules, or conditions, to determine the dependent program slices. For example, the rules may be expressed in an "if-then" format. On the other hand, a rule may indicate that, if there is an assignment statement in the software program having the form "x:=y", and variable x is already included in the program slice, then variable y may be added to a program slice.

In Step 206, results from performing pointer analyses on various program slices are analyzed in accordance with one or more embodiments. In particular, in one or more embodiments, an evaluation engine may determine a path through each program slice according to a pointer analysis objective. In one or more embodiments of the invention, the path is determined via a context-insensitive pointer analysis. In one or more embodiments of the invention, a context-sensitive pointer analysis is performed using the program slice in order to compute a points-to set. The context-sensitive analysis may construct and refine a call graph, by determining whether a method is reachable in the context of various execution sequences, in order to compute the points-to set. The analysis may consider the calling context when analyzing the target of a method call. The context used for a given method may be based on the method's receiver object as well as the object that allocates the receiver object.

In Step 208, a report is generated regarding an analysis of various results (e.g., paths) in accordance with one or more embodiments. The report may analyze whether the results from Step 206 satisfy a predetermined criterion. Specifically, the report may be presented in a display device, such as in a graphical user interface (GUI).

FIG. 3 shows a flowchart describing, in more detail than FIG. 2, the method for analyzing a software program with a pointer analysis, in accordance with one or more embodiments of the invention. One or more steps in FIG. 3 may be executed by components of the computer system (100) (discussed in reference to FIG. 1A).

In Step 300, a software program is obtained in accordance with one or more embodiments. Step 300 may be performed similarly to Step 200.

In Step 302, one or more pointer analysis objectives are obtained in accordance with one or more embodiments. For example, pointer analysis objectives may be obtained from a user as part of a desired pointer analysis for the software program from Step 300. The pointer analysis objects may be partially ordered such that a given pointer analysis objective may depend on other pointer analysis objectives in accordance with one or more embodiments (for example, see FIG. 4). In one or more embodiments of the invention, the pointer analysis objectives are components of a larger pointer analysis objective.

In Step 304, an initial pointer analysis objective is selected. In particular, a pointer analysis object from the pointer analysis objectives from Step 302 may be selected automatically by a computing system If selected by the computing system, a software application may select the initial pointer analysis objective using a software algorithm, e.g., a pseudorandom algorithm or in an iterative manner. On the other hand, if selected by a user, the user may select the initial pointer analysis objective from a set of pointer analysis objectives. Thus, a software program may obtain a selection of the initial pointer analysis objective from the user, e.g., with a graphical user interface.

In Step 306, an independent program slice of the software program is determined using the initial pointer analysis objective in accordance with one or more embodiments.

According to one or more embodiments of the invention, the independent program slice initially includes one or more interest points. For example, the interest points may be obtained from the initial pointer analysis objective in Step 304. Thus, the independent program slice initially contains variables corresponding to one or more interest points and the methods that define and/or use these variables. In one or more embodiments of the invention, the independent program slice is extended to include additional variables, fields, and/or methods of the software program. For example, the independent program slice may be extended based on the following information in the program slice: types and constructor methods of objects that are created; the source of an assignment, if the destination of the assignment is already in the slice; assignment casts; and the source of a load operation, if the result of the load operation is already in the slice. For another example, the independent program slice may be extended to include statements (e.g., method invocations), variables and fields in the call graph starting backwards from the interest points, until an entry point is encountered. Any technique for constructing or extending a program slice relative to a pointer analysis objective may be used, where the initial pointer analysis objective defines the goals of a pointer analysis. In one or more embodiments of the invention, the goals of a pointer analysis are represented as query variables.

In Step 308, a path is determined from an interest point to an entry point through an independent program slice in accordance with one or more embodiments. In particular, an evaluation engine may trace a calling path backwards from an interest point and ending at an entry point. The evaluation engine may then compute points-to sets for the pointer variables encountered along this path. For example, the pointer analysis traces the dataflow of the various pointer variables backwards by the assignment relation, starting at an interest point, and ending at an entry point. According to one or more embodiments of the invention, the entry points and interest points connected by such paths are subsequently used by a slicing algorithm in determining the composition of subsequent dependent program slices.

In Step 310, the next pointer analysis objective (also called "selected pointer analysis objective") is selected in accordance with one or more embodiments. In one or more embodiments of the invention, a pointer analysis objective A depends on one or more other pointer analysis objectives. Therefore, pointer analysis objective A may selected after the pointer analyses on which pointer analysis objective A depends have been performed. For example, see FIG. 4. and the accompanying description.

In Step 312, a dependent program slice of the software program is determined using a selected pointer analysis objective and results from performing pointer analyses on program slices in accordance with one or more embodiments. In one or more embodiments of the invention, paths resulting from performing such pointer analyses determine the overlap points between entry points of the dependent program slice and interest points of these other (independent or dependent) program slices upon which the dependent program slice depends. When the overlap between program slices is small, there may be a small number of relevant paths to consider, and it may be possible to exclude many irrelevant sub-paths that do not intersect the overlap points, thereby improving the performance of the pointer analysis due to the smaller size of the program slices being analyzed.

In Step 314, one or more results (e.g., paths) from the dependent program slice may be determined by performing a pointer analysis on the dependent program slice relative to the pointer analysis objective selected in Step 310.

If there are additional pointer analysis objectives (Step 316), then continue with Step 310 to select the next pointer analysis objective.

If there are no additional pointer analysis objectives, then, in Step 318, a report is generated. In one or more embodiments of the invention, the report identifies defects and/or opportunities to improve or optimize the software program. In one or more embodiments of the invention, the defects and/or opportunities to improve or optimize the software program relate to the presence or absence of specific results (e.g., paths between entry points and interest points in one or more program slices). For example, the report may propose solutions that remove program defects and/or exploit the identified improvement or optimization opportunities. One example of a defect may be an interest point that may potentially incur a security vulnerability when that interest point is reached by certain paths. This defect may be solved by inserting an appropriate permission, authentication, or other type of security check on the paths leading to the vulnerable interest point.

Figure 4:
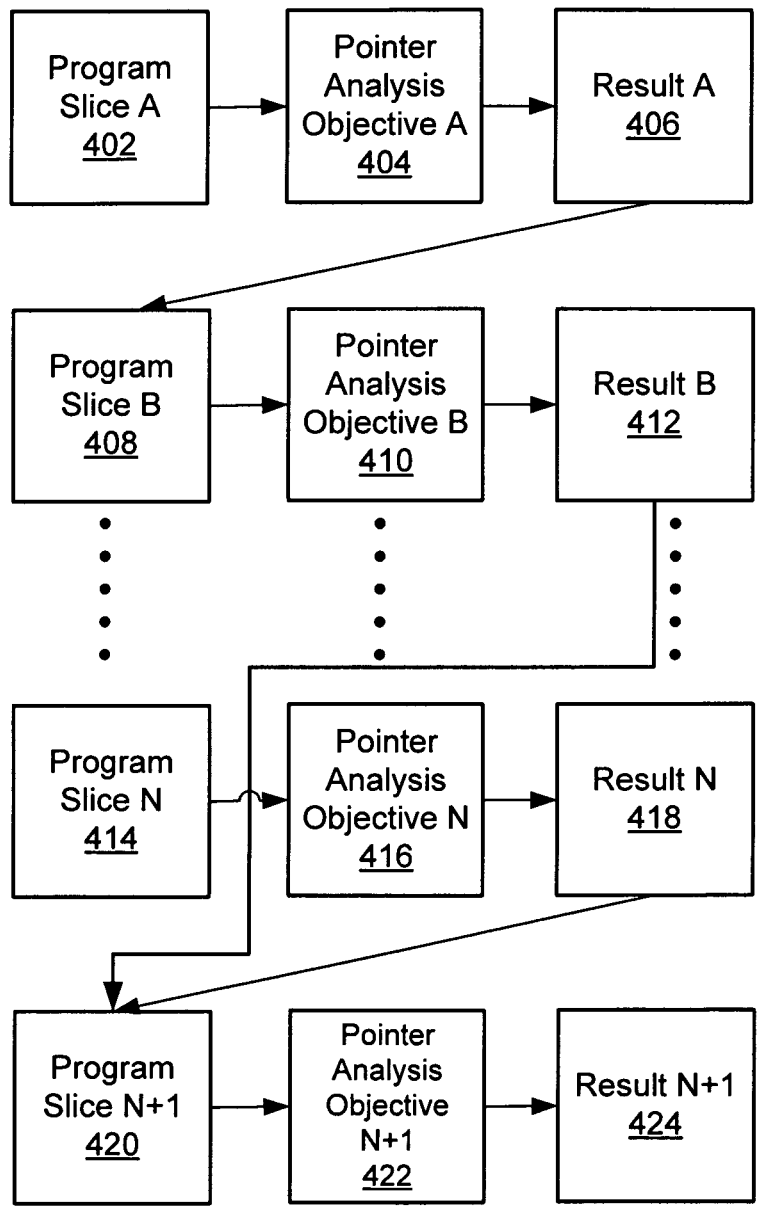
FIG. 4 shows an example in accordance with one or more embodiments of the invention.

The process as described with FIG. 4 may remove a substantial amount of irrelevant program elements, thereby reducing the overall size of the program slice being analyzed. Deep security analysis is an example of a client pointer analysis objective that is not practically analyzable on very large software programs (e.g., programs containing over 300,000 variables) using previous techniques, due to performance limitations. Such security analyses are desired to reduce the number of potential security vulnerabilities in large software programs.

The following example is for explanatory purposes only and not intended to limit the scope of the invention. FIG. 4 illustrates the dependencies of program slices (402, 408, 414, 420) on the results (406, 412, 418, 424) generated by applying pointer analyses to other program slices (402, 408, 414, 420). In accordance with one or more embodiments of the invention, program slices (402, 408, 414, 420) are analyzed in an iterative manner, relative to their corresponding pointer analysis objectives (404, 410, 416, 422), generating results (406, 412, 418, 424) for each program slice (402, 408, 414, 420). These dependencies impose a partial order on program slice (402, 408, 414, 420) generation and result (406, 412, 418, 424) generation, such that a program slice (402, 408, 414, 420) may not be generated until the results (406, 412, 418, 424) from one or more other program slices (402, 408, 414, 420) are generated. For example, program slice N+1 (420) depends on two results (406, 412, 418, 424): the result from program slice N (414) and the result from program slice B (408).

That is, instead of performing a single monolithic pointer analysis on an entire software program, where the pointer analysis is made more precise via successive refinement on successively smaller program slices, in one or more embodiments of the invention, a series of smaller pointer analyses are performed on a series of orthogonal program slices (402, 408, 414, 420). Processing each pointer analysis objective (404, 410, 416, 422) separately reduces the size of the program slice (402, 408, 414, 420) used by that pointer analysis objective (404, 410, 416, 422), making the overall analysis more efficient, despite the overhead required to compute each program slice (402, 408, 414, 420).

This approach involves dividing the overall pointer analysis objective into individual pointer analysis objectives (404, 410, 416, 422), where the pointer analysis objectives (404, 410, 416, 422) are partially ordered such that a given "dependent" pointer analysis objective (404, 410, 416, 422) may depend on the results (406, 412, 418, 424) corresponding to one or more other pointer analysis objectives (404, 410, 416, 422).

Figure 5A:
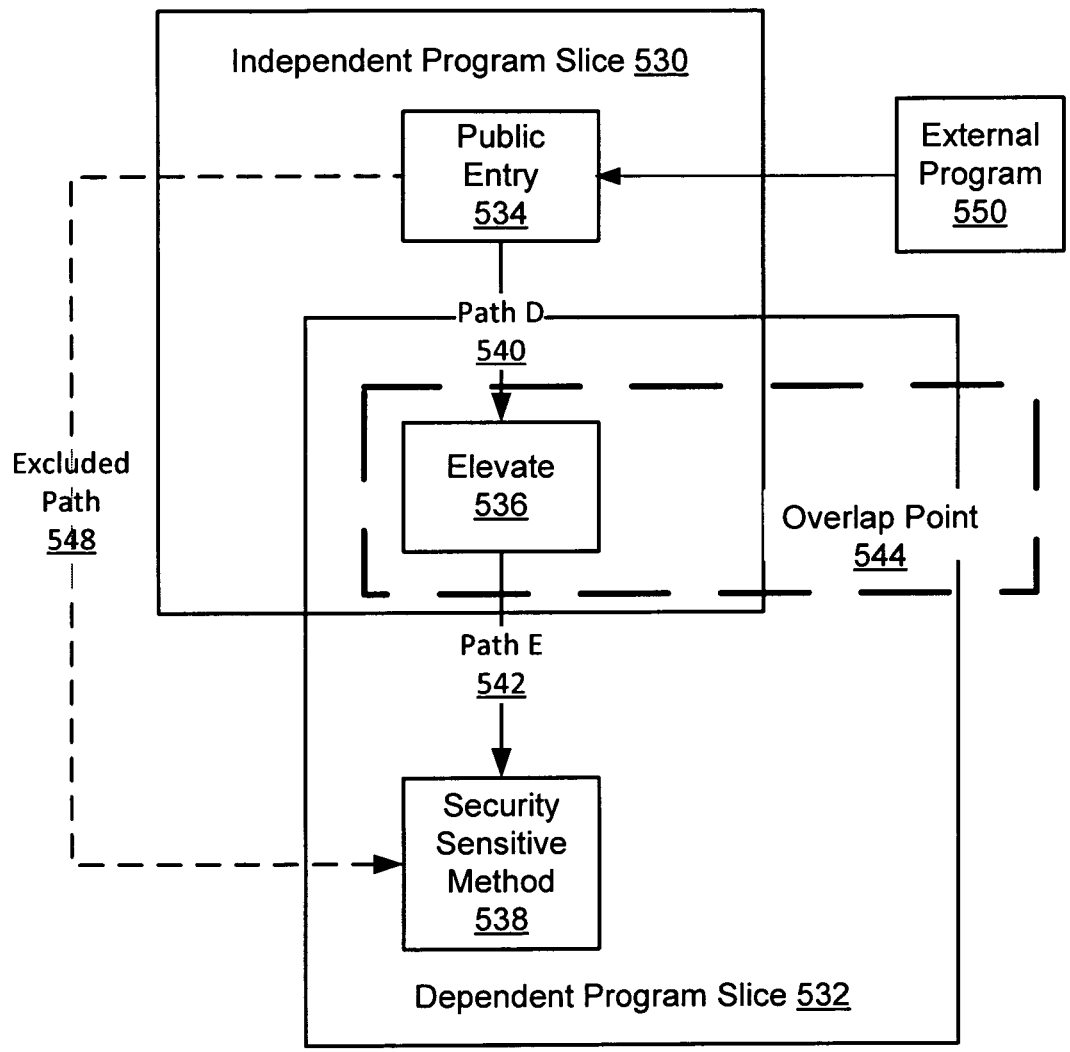
FIG. 5A and FIG. 5B show examples in accordance with one or more embodiments of the invention.

The following example is for explanatory purposes only and not intended to limit the scope of the invention. FIG. 5A illustrates the concepts of independent program slices (530), dependent program slices (532), and paths (540, 542) in the context of a simple security use case, in accordance with one or more embodiments of the invention. The following situation arises frequently in security analyses. One would like to know how an application can influence the behavior of a security-sensitive method. The analysis involves checking whether the security-sensitive method uses potentially "tainted" data (or data passed in to a software program by an application). This alone is insufficient, since if there has been no elevation of privileges, such behavior is safe. Therefore, it is useful to also identify privilege elevation (e.g., a call to the Java method doPrivileged) before the security-sensitive method is called with any potentially compromised data. However, execution paths that accept potentially tainted data and then access security-sensitive resources without elevating privileges on that path are not relevant to the security analysis, since without the privilege elevation, there is no actual security vulnerability.

In FIG. 5A, in accordance with one or more embodiments of the invention, an independent program slice (530) includes a Public Entry method (534), i.e., the entry point where the software program is invoked by an external program (550), and an Elevate statement (536) (an interest point) that elevates a software program's access privileges. The Elevate statement (536) represents the starting point for a pointer analysis within the independent program slice (530). The Public Entry method (534) represents an ending point for the pointer analysis within the independent program slice (530).

In FIG. 5A, in accordance with one or more embodiments of the invention, the dependent program slice (532) includes the Elevate statement (536) (the entry point) and a Security Sensitive Method (538) (an interest point) that accesses one or more security-sensitive resources. The Security Sensitive Method (538) represents the starting point for a pointer analysis within the dependent program slice (532). The Elevate statement (536) represents an ending point for the pointer analysis within the dependent program slice (532).

The Elevate statement (536) is an overlap point (544) between the independent program slice (530) and the dependent program slice (532). That is, the Elevate statement (536) is both the interest point of the independent program slice (530) and the entry point of the dependent program slice (532).

In accordance with one or more embodiments of the invention, performing a pointer analysis on the independent program slice (530) generates Path D (540), between the Elevate statement (536) (the interest point) and the Public Entry method (534). Performing a pointer analysis on the dependent program slice (532) generates Path E (542), between the Security Sensitive Method (538) (the interest point) and the Elevate statement (536) (the entry point for the dependent program slice (532)). The Excluded Path (548) between the Security Sensitive Method (538) of the dependent program slice (532) and the Public Entry method (534) of the independent program slice (530) is irrelevant to the security use case, since there is no elevation of privileges, and a security vulnerability arises in the context of elevated privilege.

Figure 5B:
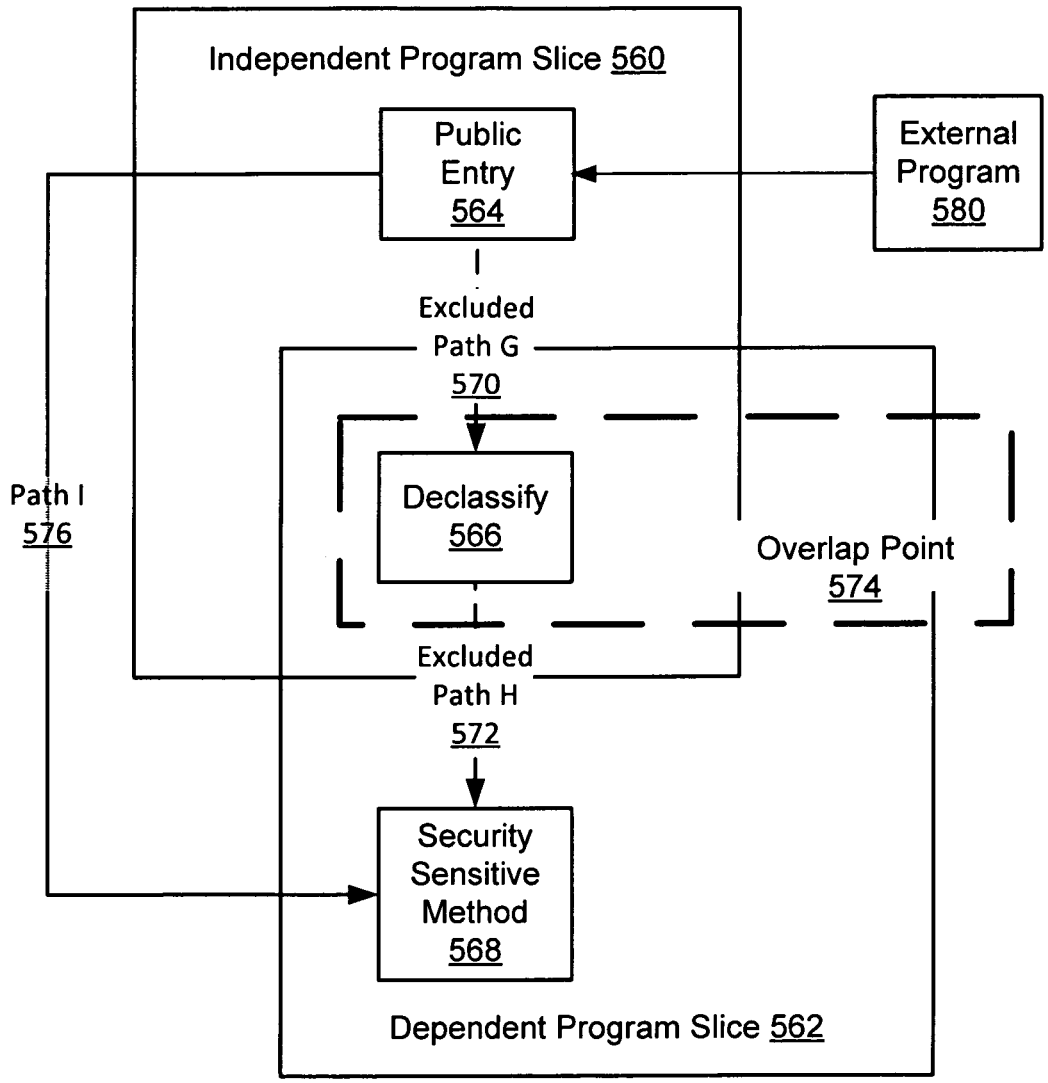

The following example is for explanatory purposes only and not intended to limit the scope of the invention. FIG. 5B illustrates an escape analysis use case similar to the security use case discussed in the context of FIG. 5A, in accordance with one or more embodiments of the invention. With escape analysis, one is interested in whether potentially sensitive data returned by a function or method "escapes" for use by other functions or methods before that sensitive data is "declassified." The escape analysis involves checking whether a security-sensitive method uses potentially sensitive data that has not been properly declassified. Escape analysis aims to identify paths that do not have proper declassification and, thus, removes paths that do declassify the potentially sensitive data before its use. In the escape analysis use case of FIG. 5B, in contrast to the security use case of FIG. 5A, the Public Entry method (564) is the interest point, rather than the entry point, and the Security Sensitive Method (568) is the entry point, rather than the interest point.

In FIG. 5B, in accordance with one or more embodiments of the invention, the independent program slice (560) includes a Public Entry method (564), i.e., the interest point where the software program is invoked by an external program (580) and a Declassify statement (566) (an entry point) that removes or transforms any sensitive aspects of data. The Public Entry method (564) is determined to be the independent program slice's (560) interest point based on a pointer analysis objective and represents a starting point for the pointer analysis within the independent program slice (560). The Declassify statement (566) is determined to be the independent program slice's (560) entry point based on a pointer analysis objective and represents the ending point for a pointer analysis within the independent program slice (560).

In FIG. 5B, in accordance with one or more embodiments of the invention, the dependent program slice (562) includes the Declassify statement (566) (an interest point) and the Security Sensitive Method (568) (an entry point). The Security Sensitive Method (568) is determined to be the dependent program slice's (562) entry point based on a pointer analysis objective and represents the ending point for a pointer analysis within the dependent program slice (562). The Declassify statement (566) is determined to be the dependent program slice's (562) interest point based on a pointer analysis objective and represents a starting point for the pointer analysis within the dependent program slice (562).

The Declassify statement (566) is the overlap point (574) between the independent program slice (560) and the dependent program slice (562). That is, the Declassify statement (566) is both the entry point of the independent program slice (560) and the interest point of the dependent program slice (562).

In the escape analysis use case of FIG. 5B, in accordance with one or more embodiments of the invention, Excluded Path G (570) between the Declassify statement (566) (the entry point) and the Public Entry method (564) (the interest point for the independent program slice (560)) is excluded from the independent program slice (560). Similarly, Excluded Path H (572) between the Security Sensitive Method (568) (the entry point) and the Declassify statement (566) (the interest point for the dependent program slice (562)) is excluded from the dependent program slice (562). Excluded Path G (570) and Excluded Path H (572) are excluded because the Declassify statement (566) occurs before the potentially security-sensitive data reaches the Public Entry method (564) and, therefore, the potential security risk has been averted. Therefore, only Path I (576) is relevant to the escape analysis is between the Security Sensitive Method (568) of the dependent program slice (562) and the Public Entry method (564) of the independent program slice (560), since the Public Entry method (564) has access to the un-declassified sensitive data via Path I (576).

Additional use cases may include checking for memory leaks, checking for circular references, and virtual calls resolution, among others.

Figure 6B:
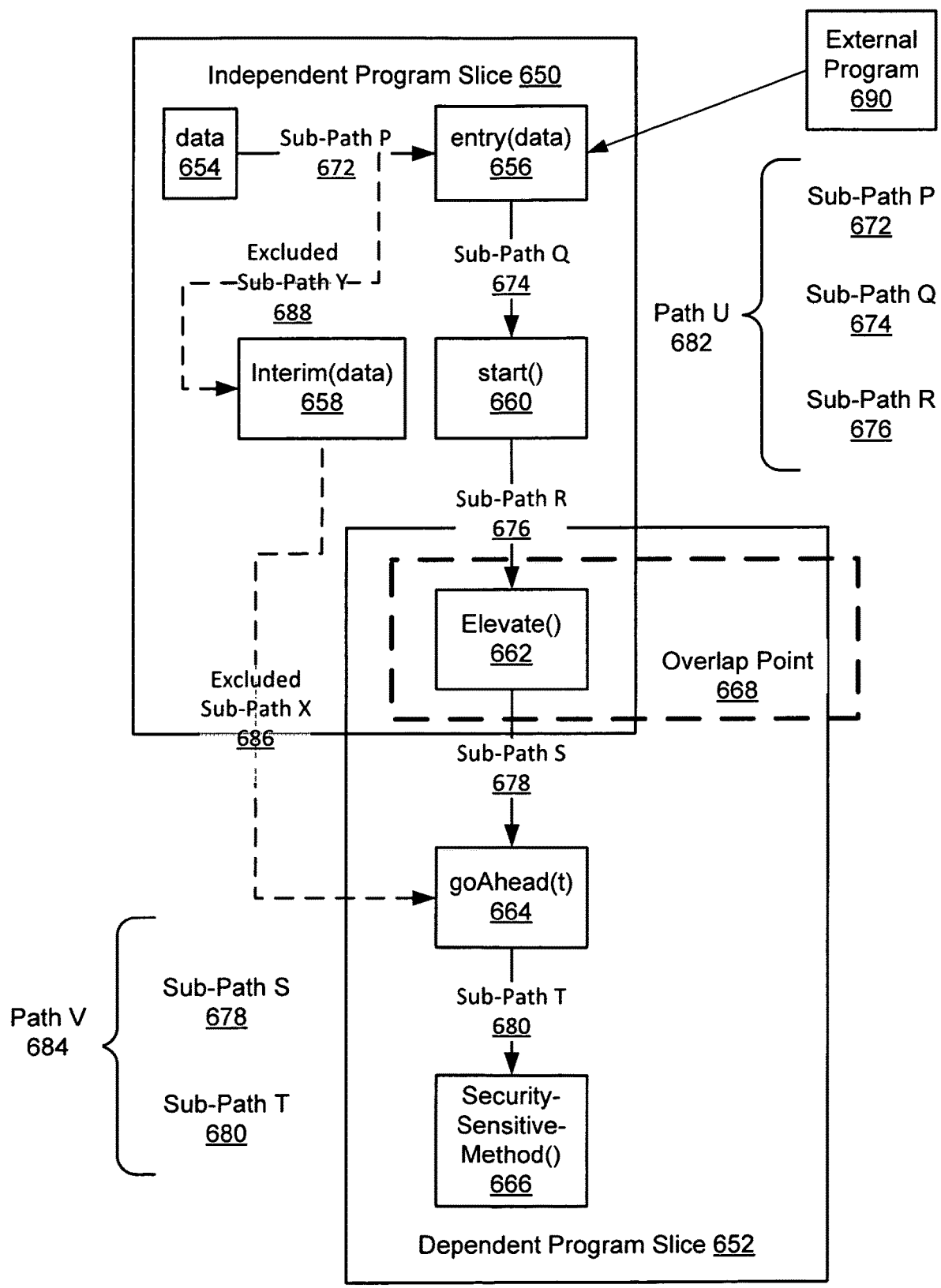

The following example is for explanatory purposes only and not intended to limit the scope of the invention. FIGS. 6A and 6B illustrate an example in accordance with one or more embodiments of the invention.

FIG. 6A shows a small program, whose corresponding program slices and paths are shown in FIG. 6B. In FIG. 6A, the class Example (602) defines a local variable field of type T (604) and a public method entry (606) whose input argument data is also of type T. For the purpose of security analysis, we assume that the input argument data may be compromised or tainted. The method entry (606) sets the value of field to be the value of input argument data and then calls the private method interim (610) with the potentially tainted argument data. The class Example (602) has another public method start (612) which calls the private method elevate (614). Note that an application may invoke both the public methods entry (606) and start (612). The private method interim (616) accepts an input argument t of type T and calls the private method goAhead (618). The private method elevate (620) calls the private method goAhead (622) with the local variable field. The private method goAhead (624) accepts an input argument t of type T and calls security-sensitive-method (626) (which is a method of the type T).

The potentially tainted value data may be passed from the public method entry (606) to the private method interim (610) and then to the private method goAhead (618) and finally to the private method security-sensitive-method (626), but there is no privilege elevation on this path. Alternatively, an application may invoke the public method start (612) which calls the private method elevate (614) which then calls the private method goAhead (622) with the potentially tainted value from the local variable field and then finally invokes the private method security-sensitive-method (626). In this latter case, the potentially tainted data is passed with privilege elevation.

Using conventional slicing methods, a single, backward program slice starting from security-sensitive-method (626) would include the method goAhead (624). The slicing process would continue backward and include the methods elevate (620) interim (616), start (612), and entry (606). The method interim (616) would be included in the program slice since when it is processed by the slicing algorithm, a call to elevate (620) prior to invoking interim (616) cannot be ruled out.

In contrast, applying the approach of this invention, generating an independent program slice traces the flow of the potentially tainted data to the local variable field (608) and its flow to the call to the method goAhead (622) inside the method elevate (620). Generating the independent program slice will also trace the flow of the potentially tainted data to the method interim (610). In the next phase, generating a dependent program slice traces the flow from the method elevate (620) to the method security-sensitive-method (626) and will therefore also include the method goAhead (624). Note that the method elevate (614, 620) represents the overlap point between the independent program slice and the dependent program slice. Thus, the method goAhead (624) will be present in the dependent program slice, but the irrelevant sub-path from interim (616) to goAhead (624) (and then continuing to security-sensitive-method (626)) will be excluded. This excluded sub-path is illustrated in FIG. 6B.

FIG. 6B illustrates an independent program slice (650), a dependent program slice (652) and paths (682, 684) corresponding to the software program shown in FIG. 6A, in accordance with one or more embodiments of the invention. In FIG. 6B, the independent program slice (650) includes an input variable data (654) to a public method called entry (656), where the software program may be invoked by an external program (690). The independent program slice (650) also includes an internal method called interim (658) and an elevate statement (662) (an interest point). The independent program slice (650) also includes another public method called start (660), which invokes the elevate statement (662) using a potentially tainted value. The elevate statement (662) represents the starting point for a pointer analysis within the independent program slice (650). The input variable data (654) is an entry point, representing an ending point for the pointer analysis within the independent program slice (650).

In FIG. 6B, the dependent program slice (652) includes the elevate statement (662) (the entry point), an internal method called goAhead (664), and an internal method called security-sensitive-method (666) (an interest point). The security-sensitive-method (666) represents the starting point for a pointer analysis within the dependent program slice (652). The elevate statement (662) represents an ending point for the pointer analysis within the dependent program slice (652).

The elevate statement (662) is the overlap point (668) between the independent program slice (650) and the dependent program slice (652). That is, the elevate statement (662) is both the interest point of the independent program slice (650) and the entry point of the dependent program slice (652).

Performing a pointer analysis on the independent program slice (650) generates path U (682) consisting of sub-path P (672), sub-path Q (674), and sub-path R (676). Sub-path P (672) connects the entry method (656) to the input variable data (654), sub-path Q (674) connects the start method (660) to the entry method (656), and sub-path R (676) connects the elevate statement (662) to the start method (660). Performing a pointer analysis on the dependent program slice (652) generates path V (684) consisting of sub-path S (678) and sub-path T (680). Sub-path S (678) connects the goAhead method (664) to the elevate statement (662) (the entry point of the dependent program slice (652)), and sub-path T (680) connects security-sensitive-method (666) (the interest point) to the goAhead method (664).

Excluded Sub-Path X (686) between the goAhead method (664) and the interim method (658) and Excluded Sub-path Y (688) between the interim method (658) and the entry method (656) are irrelevant to the pointer analysis in this security use case, since there is no elevation of privileges on these sub-paths.

Figure 7:
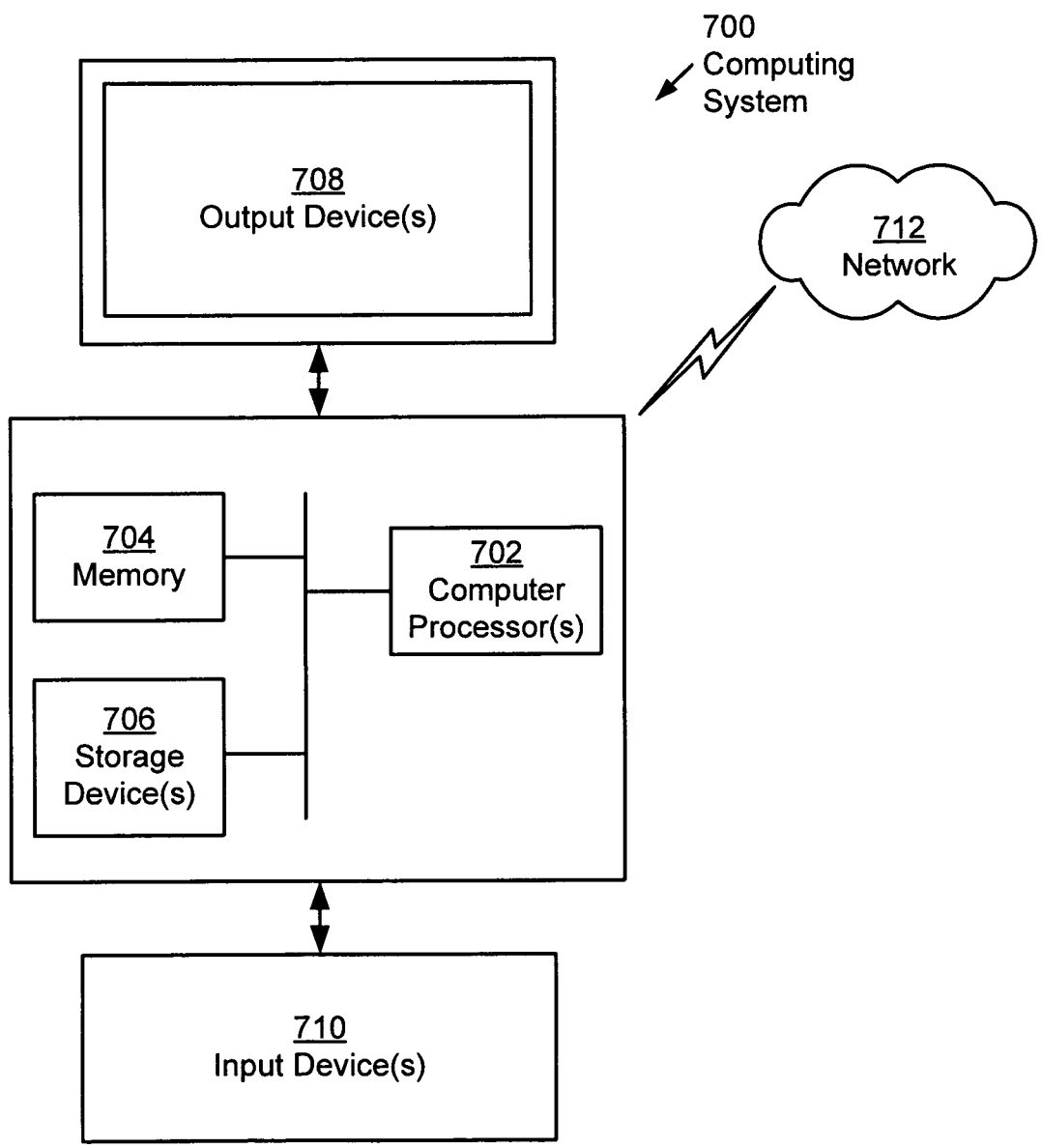
FIG. 7 shows a computing system in accordance with one or more embodiments of the invention.

Embodiments of the invention may be implemented on a computing system (700). Any combination of mobile, desktop, server, embedded, or other types of hardware may be used. For example, as shown in FIG. 7, the computing system (700) may include one or more computer processor (s) (702), associated memory (704) (e.g., random access memory (RAM), cache memory, flash memory, etc.), one or more storage device(s) (706) (e.g., a hard disk, an optical drive such as a compact disk (CD) drive or digital versatile disk (DVD) drive, a flash memory stick, etc.), and numerous other elements and functionalities. The computer processor (s) (702) may be an integrated circuit for processing instructions. For example, the computer processor(s) may be one or more cores, or micro-cores of a processor. In one or more embodiments of the invention, a computer processor (702) is any hardware capable of, at least in part, executing sequences of instructions (e.g., the instructions of a computer program) in a computing system (700). In one or more embodiments of the invention, a computer processor (702) is a collection of electronic circuitry capable of implementing various actions (e.g., arithmetic, Boolean logic, move data, etc.) in order to carry out instructions (e.g., write to a variable, read a value, etc.). For example, a processor may be a microprocessor fabricated, at least in part using a semiconducting material, as one or more integrated circuits.

The computing system (700) may also include one or more input device(s) (710), such as a touchscreen, keyboard, mouse, microphone, touchpad, electronic pen, or any other type of input device. Further, the computing system (700) may include one or more output device(s) (708), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (700) may be connected to a network (712) (e.g., a local area network (LAN), a wide area network (WAN) such as the Internet, mobile network, or any other type of network) via a network interface connection (not shown). The input and output device(s) may be locally or remotely (e.g., via the network (712)) connected to the computer processor(s) (702), memory (704), and storage device(s) (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform embodiments of the invention.

Further, one or more elements of the aforementioned computing system (700) may be located at a remote location and connected to the other elements over a network (712). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for analyzing software with pointer analysis, comprising:
    obtaining a software program comprising a collection of source code;
    determining a first independent program slice of the software program,
        wherein the first independent program slice is a first code segment of the software program, the first code segment comprising a first interest point and a first entry point,
        wherein the first interest point accesses a security sensitive resource of a computer system,
        wherein the first interest point and the first entry point are statements of the first independent program slice of the software program,
        wherein the first interest point is a security sensitive method with an elevated privilege, and
        wherein the elevated privilege permits access to the security sensitive resource;
    performing a first pointer analysis on the first independent program slice to obtain a first result comprising a first path that represents a calling sequence from the first entry point to the first interest point, wherein the first pointer analysis corresponds to an analysis of a security risk associated with data provided at the first entry point, wherein the data is provided to a pointer variable at the first entry point, and wherein the pointer variable comprises a value that references a memory location;
    determining, using the first interest point of the first path, a first dependent program slice of the software program overlapping the first independent program slice at an exact same statement in the software program,
        wherein the first dependent program slice is a second code segment of the software program comprising a second entry point and a second interest point, and
        wherein both the first interest point and the second entry point are the exact same statement in the software program where the first independent program slice and the first dependent program slice overlap;
    performing a second pointer analysis on the first dependent program slice to obtain a second result comprising a second path that represents a calling sequence from the second entry point to the second interest point;
    excluding, from the second pointer analysis, an irrelevant path that represents a calling sequence from the first entry point to the second interest point based on determining that the irrelevant path fails to include an exact same statement where the first independent program slice and the first dependent program slice overlap;
    generating a report, using the first result and the second result, indicating whether the software program satisfies a predetermined criterion,
        wherein the predetermined criterion assesses the security risk; and assessing the security risk using the report.

2. The method of claim 1, further comprising:
    obtaining a plurality of pointer analysis objectives for the software program, wherein the plurality of pointer analysis objectives comprises a first pointer analysis objective and a second pointer analysis objective;
    determining, in an iterative manner and using the plurality of pointer analysis objectives, a respective program slice for a respective pointer analysis objective from the plurality of pointer analysis objectives, wherein the respective program slice comprises a respective code segment of the software program; and
    determining, using the respective program slice and the respective pointer analysis objective, a respective result from performing a respective pointer analysis on the software program.

3. The method of claim 1,
    wherein the second result comprises a third path from the second interest point to the second entry point.

4. The method of claim 1, further comprising:
    determining an elevation instruction within the first independent program slice, wherein the elevation instruction elevates a security privilege within the software program; and
    determining, using the first result, a second dependent program slice of the software program, wherein the second dependent program slice is a third code segment of the software program, wherein the third code segment comprises a third entry point and a third interest point,
    wherein determining the first path comprises:
        determining a first plurality of instructions between the third interest point and the elevation instruction; and
        determining a second plurality of instructions between the elevation instruction and the first entry point.

5. The method of claim 1,
    wherein the first pointer analysis comprises a location of the first interest point in the software program and a location of the first entry point in the software program,
    wherein determining the first independent program slice comprises determining, for the first code segment, a plurality of instructions within the software program near the locations of the first interest point and the first entry point, and
    wherein the plurality of instructions is reachable via the calling sequence from the first entry point to the first interest point.

6. A system for analyzing a software program comprising a collection of source code with pointer analysis, comprising:
    a processor,
    a repository, configured to store at least the software program, and
    a memory comprising instructions that, when executed by the processor, cause the processor to:
        obtain a software program;
        determine a first independent program slice of the software program,
            wherein the first independent program slice is a first code segment of the software program, the first code segment comprising a first interest point and a first entry point, wherein the first interest point accesses a security sensitive resource of a computer system, wherein the first interest point and the first entry point are statements of the first independent program slice of the software program, wherein the first interest point is a security sensitive method with an elevated privilege, and wherein the elevated privilege permits access to the security sensitive resource;

perform a first pointer analysis on the first independent program slice to obtain a first result comprising a first path that represents a calling sequence from the first entry point to the first interest point, wherein the first pointer analysis corresponds to an analysis of a security risk associated with data provided at the first entry point, wherein the data is provided to a pointer variable at the first entry point, and wherein the pointer variable comprises a value that references a memory location;

determine, using the first interest point of the first path, a first dependent program slice of the software program overlapping the first independent program slice at an exact same statement in the software program, wherein the first dependent program slice is a second code segment of the software program comprising a second entry point and a second interest point, and wherein both the first interest point and the second entry point are the exact same statement in the software program where the first independent program slice and the first dependent program slice overlap;

perform a second pointer analysis on the first dependent program slice to obtain a second result comprising a second path that represents a calling sequence from the second entry point to the second interest point;

exclude, from the second pointer analysis, an irrelevant path that represents a calling sequence from the first entry point to the second interest point based on determining that the irrelevant path fails to include an exact same statement where the first independent program slice and the first dependent program slice overlap;

generate a report, using the first result and the second result, indicating whether the software program satisfies a predetermined criterion, wherein the predetermined criterion assesses the security risk; and assess the security risk using the report.

7. The system of claim 6, wherein the memory further comprises instructions that, when executed by the processor, cause the processor to:

obtain a plurality of pointer analysis objectives for the software program, wherein the plurality of pointer analysis objectives comprises a first pointer analysis objective and a second pointer analysis objective;

determine, in an iterative manner and using the plurality of pointer analysis objectives, a respective program slice for a respective pointer analysis objective from the plurality of pointer analysis objectives, wherein the respective program slice comprises a respective code segment of the software program; and determine, using the respective program slice and the respective pointer analysis objective, a respective result from performing a respective pointer analysis on the software program.

8. The system of claim 6, wherein the second result comprises a third path from the second interest point to the second entry point.

9. The system of claim 6, wherein the memory further comprises instructions that, when executed by the processor, cause the processor to:

determine an elevation instruction within the first independent program slice, wherein the elevation instruction elevates a security privilege within the software program; and determine, using the first result, a second dependent program slice of the software program, wherein the second dependent program slice is a third code segment of the software program, wherein the third code segment comprises a third entry point and a third interest point, wherein determining the first path comprises:
determining a first plurality of instructions between the third interest point and the elevation instruction; and
determining a second plurality of instructions between the elevation instruction and the first entry point.

10. The system of claim 6, wherein the first pointer analysis comprises a location of the first interest point in the software program and a location of the first entry point in the software program, wherein determining the first independent program slice comprises determining, for the first code segment, a plurality of instructions within the software program near the locations of the first interest point and the first entry point, and wherein the plurality of instructions is reachable via the calling sequence from the first entry point to the first interest point.

11. A non-transitory computer readable medium comprising instructions that, when executed by a processor, perform a method for analyzing software with pointer analysis, the method comprising:

obtaining a software program comprising a collection of source code;

determining a first independent program slice of the software program, wherein the first independent program slice is a first code segment of the software program, the first code segment comprising a first interest point and a first entry point, wherein the first interest point accesses a security sensitive resource of a computer system, wherein the first interest point and the first entry point are statements of the first independent program slice of the software program, wherein the first interest point is a security sensitive method with an elevated privilege, and wherein the elevated privilege permits access to the security sensitive resource;

performing a first pointer analysis on the first independent program slice to obtain a first result comprising a first path that represents a calling sequence from the first entry point to the first interest point, wherein the first pointer analysis corresponds to an analysis of a security risk associated with data provided at the first entry point, wherein the data is provided to a pointer variable at the first entry point, and wherein the pointer variable comprises a value that references a memory location;

determining, using the first interest point of the first path, a first dependent program slice of the software program overlapping the first independent program slice at an exact same statement in the software program,
  wherein the first dependent program slice is a second code segment of the software program comprising a second entry point and a second interest point, and
  wherein both the first interest point and the second entry point are the exact same statement in the software program where the first independent program slice and the first dependent program slice overlap;
performing a second pointer analysis on the first dependent program slice to obtain a second result comprising a second path that represents a calling sequence from the second entry point to the second interest point;
excluding, from the second pointer analysis, an irrelevant path that represents a calling sequence from the first entry point to the second interest point based on determining that the irrelevant path fails to include an exact same statement where the first independent program slice and the first dependent program slice overlap;
generating a report, using the first result and the second result, indicating whether the software program satisfies a predetermined criterion,
  wherein the predetermined criterion assesses the security risk; and
assessing the security risk using the report.

12. The non-transitory computer readable medium of claim 11, wherein the method further comprises:
  obtaining a plurality of pointer analysis objectives for the software program, wherein the plurality of pointer analysis objectives comprises a first pointer analysis objective and a second pointer analysis objective;
  determining, in an iterative manner and using the plurality of pointer analysis objectives, a respective program slice for a respective pointer analysis objective from the plurality of pointer analysis objectives, wherein the respective program slice comprises a respective code segment of the software program; and
  determining, using the respective program slice and the respective pointer analysis objective, a respective result from performing a respective pointer analysis on the software program.

13. The non-transitory computer readable medium of claim 11,
  wherein the second result comprises a third path from the second interest point to the second entry point.

14. The non-transitory computer readable medium of claim 11, wherein the method further comprises:
  determining an elevation instruction within the first independent program slice, wherein the elevation instruction corresponds to a security privilege within the software program; and
  determining, using the first result, a second dependent program slice of the software program, wherein the second dependent program slice is a third code segment of the software program, wherein the third code segment comprises a third entry point and a third interest point,
  wherein determining the first path comprises:
    determining a first plurality of instructions between the third interest point and the elevation instruction; and
    determining a second plurality of instructions between the elevation instruction and the first entry point.

* * * * *